United States Patent [19]

Yamada et al.

[11] Patent Number: 4,458,916
[45] Date of Patent: Jul. 10, 1984

[54] AUTOMATIC SEAT BELT DEVICE FOR VEHICLE

[75] Inventors: Makoto Yamada; Takayoshi Masutani, both of Toyota, Japan

[73] Assignee: Toyota Jidosha Kabushiki Kaisha, Aichi, Japan

[21] Appl. No.: 418,251

[22] Filed: Sep. 15, 1982

[30] Foreign Application Priority Data

Dec. 21, 1981 [JP] Japan ................. 56-206704

[51] Int. Cl.³ ............................ B60R 21/10
[52] U.S. Cl. .................. 280/802; 280/808; 297/476; 297/483
[58] Field of Search ........... 280/802, 803, 804, 808; 297/468, 476, 483

[56] References Cited

U.S. PATENT DOCUMENTS 4,225,155 9/1980 Seiffert et al. ................. 280/804
4,372,580 2/1983 Motonami et al. ............. 280/802
4,394,035 7/1983 Sato ................................ 280/804

Primary Examiner—Richard A. Bertsch
Attorney, Agent, or Firm—Parkhurst & Oliff

[57] ABSTRACT

An automatic seat belt device for a vehicle, which has a switch inserted into a driving circuit for opening the driving circuit upon releasing of an emergency buckle. Thus, this device can disable the guide arm driving device when an adult's seat belt attached to a seat is not used like when a children's seat belt is used.

3 Claims, 3 Drawing Figures

AUTOMATIC SEAT BELT DEVICE FOR VEHICLE

BACKGROUND OF THE INVENTION

This invention relates to an automatic seat belt device for a vehicle and, more particularly, to improvements in an automatic seat belt device having a guide arm for moving a seat belt webbing forwardly of a seat in response to the opening of an automotive door and guiding the webbing to a position for restricting a passenger in response to the closing of the door.

A conventional automatic seat belt device has, as shown in FIG. 1, a driving circuit for a guide arm. This driving circuit has a door switch A which includes a movable contact B, an open side contact C and a closed side contact G. When the door of a vehicle is opened, the movable contact B of the door switch A is contacted to the open side contact C. The driving circuit further has a limit switch D which is connected at its input terminal to the open side contact C, and another limit switch H which is connected at its input terminal to the closed side contact G. When the movable contact B is contacted to the open side contact C as described above, a circuit E from the limit switch D through the open side contact C, the movable contact B to the ground is closed. If the limit switch D is closed at this time, a driving circuit F is formed from the output terminal of the limit switch D through the driving circuit F having a motor M and is operated to rotate the guide arm of a seat belt webbing (not shown) forwardly of the seat.

The above-mentioned limit switch D is provided at a position for limiting the rotating position of the guide arm. When the limit switch D is operated by the guide arm, the switch D is opened to thereby open the circuit E from the limit switch D through the open side contact C, the movable contact B to the ground, and is operated to stop the rotation of the guide arm.

This driving circuit for driving the guide arm is constructed to open or close the driving circuit F having the motor M by the opening or closing of the door switch A irrespective of the operation or release of an emergency buckle (not shown). Thus, this driving circuit has such disadvantages that the guide arm repeatedly telescopes. Therefore, when an infant's seat belt is used on the seat and the adult's seat belt is not used on the seat, the guide arm is driven.

SUMMARY OF THE INVENTION

Therefore, a primary object of this invention is to provide an automatic seat belt device for a vehicle which has a guide arm for moving a seat belt webbing forwardly of a seat in response to the opening of an automotive door and guiding the webbing to a position for restricting a passenger in response to the closing of the door.

Another object of this invention is to provide an automatic seat belt device for a vehicle which can disable a guide arm driving device when an adult's seat belt attached to a seat is not used, for example when a children's seat belt is used on the seat.

Still another object of this invention is to provide an automatic seat belt device for a vehicle which can inhibit the drive of the guide arm of a seat belt webbing when an emergency buckle is released.

Still another object of the invention is to provide an automatic seat belt device for a vehicle which can continuously hold a guide arm at the position in which the guide arm does not disturb passenger's ride on or off the vehicle.

BRIEF DESCRIPTION OF THE DRAWINGS

The foregoing objects and other objects as well as the characteristic features of the invention will become more apparent and more readily understandable by the following description and the appended claims when read in conjunction with the accompanying drawings wherein:

DESCRIPTION OF THE PREFERRED EMBODIMENTS

The present invention will now be described in more detail with reference to the accompanying drawings.

Figure 1:
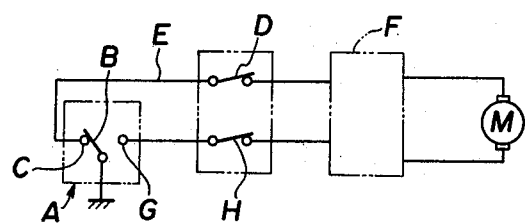
FIG. 1 is a circuit diagram of the guide arm driving circuit of the conventional automatic seat belt device.
Figure 2:
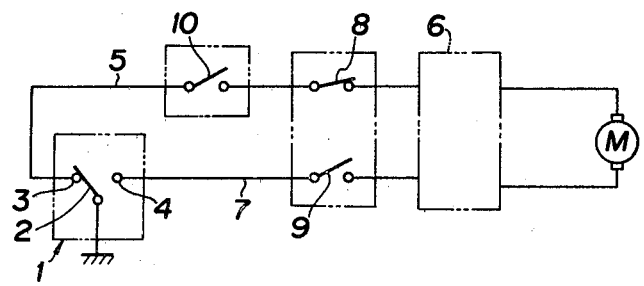
FIG. 2 is a circuit diagram of a guide arm driving circuit empoloyed according to one referred embodiment of the present invention.

In FIG. 2, a door switch 1 has a movable contact 2 which moves in response to the opening or closing of an automotive door, an open side contact 3 which is contacted with the movable contact 2 when the door is opened, and a closed side contact 4 which is contacted with the movable contact 2 when the door is closed. The open side contact 3 of the door switch 1 is connected through a circuit or line 5 to a driving circuit 6 of a driving motor M for driving a guide arm (not shown) for guiding a seat belt webbing as will be described in greater detail. The closed side contact 4 of the door switch 1 is also connected to the driving circuit 6 through a circuit or line 7.

In the above-mentioned circuit 5 is inserted a limit switch 8 which is connected at its input side to the movable contact 2 of the door switch 1 and is also connected at its input side to the movable contact 2 of the door switch 1 and is also connected at its output side to the driving circuit 6 of the driving motor M to stop the rotation of the guide arm at a predetermined position when the guide arm is rotated forwardly of the seat. In the above-described circuit 7 is inserted an another limit switch 9 which is connected at its input side to the closed side contact 4 of the door switch 1 and is also connected at its output side to the driving circuit 6 of the driving motor M to stop the rotation of the guide arm at a predetermined position when the guide arm is retarded to a passenger restricting position.

In the above-described circuit 5 is also inserted a switch 10 which is opened, for the purpose of using a children's seat belt on the seat, when an emergency buckle (not shown) in FIG. 2 of adult's seat belt attached to the seat is released.

In FIG. 2, there is shown the state that the switch 10 is opened from the result that the guide arm of the seat belt webbing is disposed at the position for restricting a passenger so as not to disturb the riding on or off the vehicle, i.e., the limit switch 8 is closed and the emergency buckle is released. In this state, the door is opened, and the movable contact 2 of the door switch 1 is contacted with the open side contact 3. Since the switch 10 is opened, the circuit 5 is maintained open. Accordingly, even if the automotive door is opened, the driving circuit 6 of the driving motor M of the guide arm is not operated, and the guide arm is held at the passenger restricting position. Assume that the switch 10 is not inserted in the circuit 5, even if the emergency buckle is released, the driving circuit 6 is operated in response to the opening of the automotive door. Thus, the guide arm is rotated forwardly of the seat until the limit switch 8 is opened, thereby disturbing the riding on or off of the passenger. However, according to the present invention, such a disturbing phenomenon can be completely eliminated.

Figure 3:
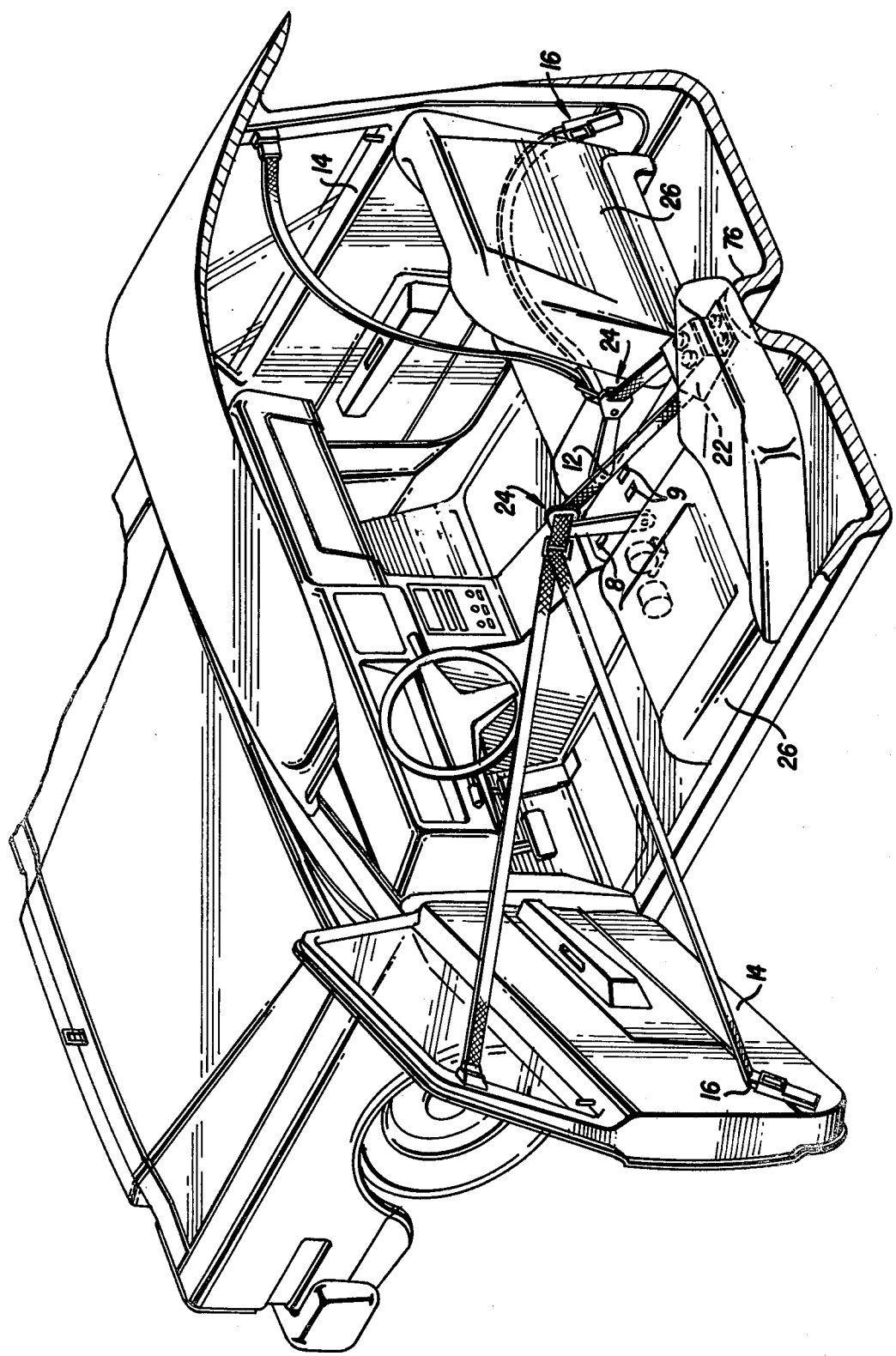
FIG. 3 is a perspective view showing an embodiment of the automatic seat belt device according to the invention.

FIG. 3 illustrates the use of a preferred embodiment of the inventive automatic seat belt device in a vehicle. Each seat 26 has a seat belt 12 which extends from a vehicle door 14, across the seat 26 to an anchor 22 located on the floor 76 of the vehicle between the seats. Each seat belt 12 is threaded through a guide arm 24 which is pivotably mounted adjacent to the vehicle floor between the limit switches 8,9. An emergency buckle 16 connects the seat belt to the door 14.

When, for example, the driver's side door is open and the buckle is not released, then opening of the door results in the guide arm 24 moving forwardly until it engages limit switch 8. When, for example, the passenger side door is closed and the buckle is not released, then the guide arm 24 pivots rearwardly until it engages the limit switch 9. In the event that the buckle 16 is released, then the seat belt cannot restrict a passenger. Release of the buckle 16 opens the switch 10 so that opening or closing of the door does not cause the guide arm to move.

According to the present invention as described above, there is provided an automatic seat belt device for a vehicle, having a guide arm for moving a seat belt webbing forwardly of a seat in response to the opening or closing of an automotive door and guiding the webbing to a position for restricting a passenger in response to the closing of the door. Accordingly, the automatic seat belt device of the invention can disable a guide arm driving device when an adult's seat belt attached to a seat is not used, for example, when a children's seat belt is used on the seat. The seat belt device of the invention can also inhibit the drive of the guide arm of a seat belt webbing when an emergency buckle is released, and moreover can continuously hold the guide arm at the position in which the guide arm does not disturb passenger's ride on or off the vehicle.

What is claimed is:

1. An automatic seat belt device for a vehicle having a guide arm for moving a seat belt webbing forwardly of the seat with the opening of a door and for guiding the seat belt webbing to a passenger restricting position with the closure of the door, said automatic seat belt device comprising:

a door switch having a movable contact responsive to the opening and closure of the door, an open side contact contacted with the movable contact upon opening of the door, and a closed side contact contacted with the movable contact upon closure of the door, a first circuit for connecting the open side contact with a driving circuit of a drive motor of the guide arm for guiding the seat belt webbing, a second circuit for connecting the closed side contact with the driving circuit, a first limit switch for stopping the driving of the guide arm when the guide arm is rotated to the front side of the seat, said first limit switch being in said first circuit, a second limit switch for stopping the driving of the guide arm when the guide arm is rotated to the passenger restricting position, said second limit switch being in said second circuit, and a switch in said first circuit to open when an emergency buckle in said seat belt is released for detecting whether said seat belt can restrict said passenger, whereby when said switch detects a condition of said seat belt release, said first circuit is open and said guide arm does not move said seat belt forwardly.

2. The automatic seat belt device for a vehicle according to claim 1, wherein said switch is in the emergency buckle.

3. The automatic seat belt device for a vehicle according to claim 2, wherein said emergency buckle is on said door.

* * * * *